Patented Oct. 25, 1927.

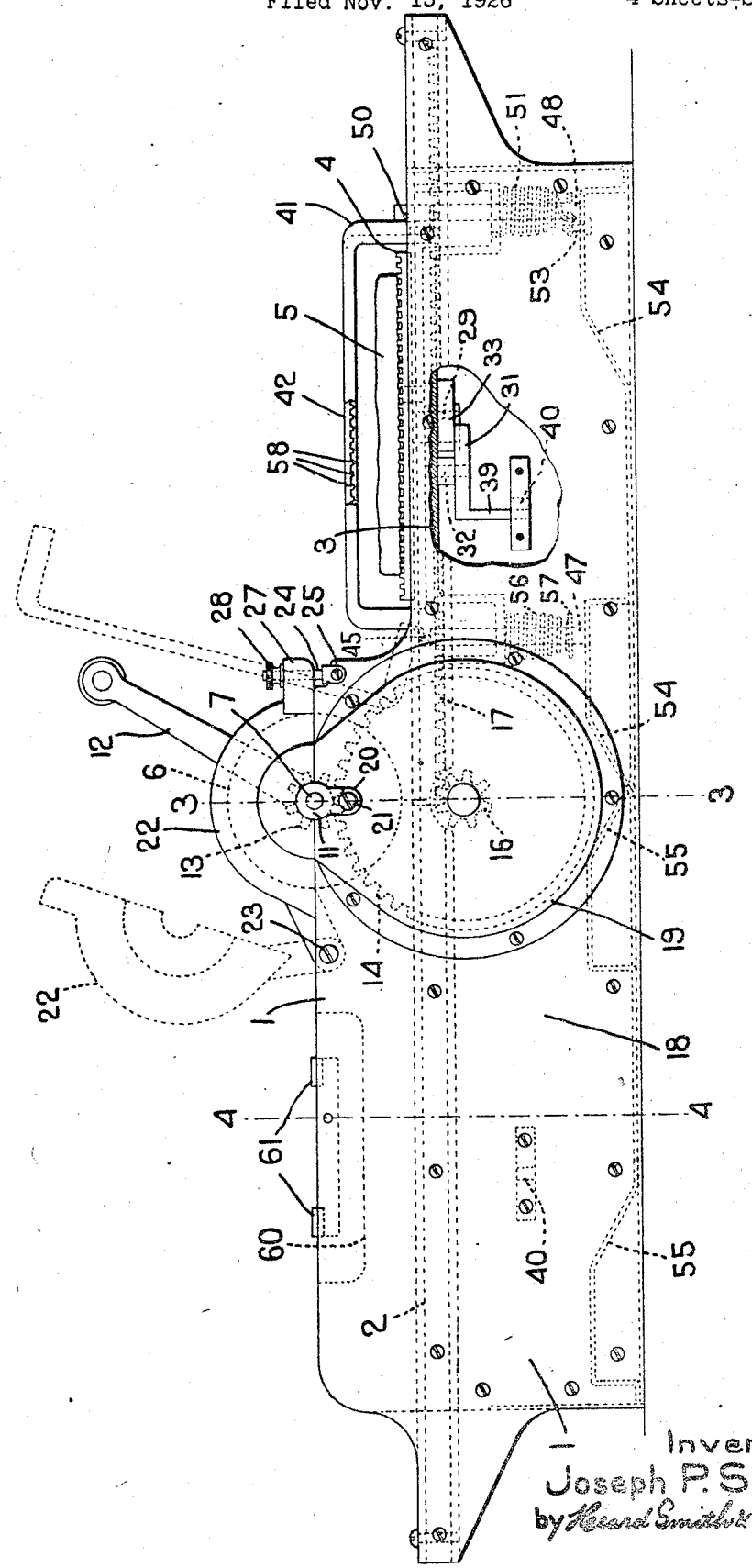

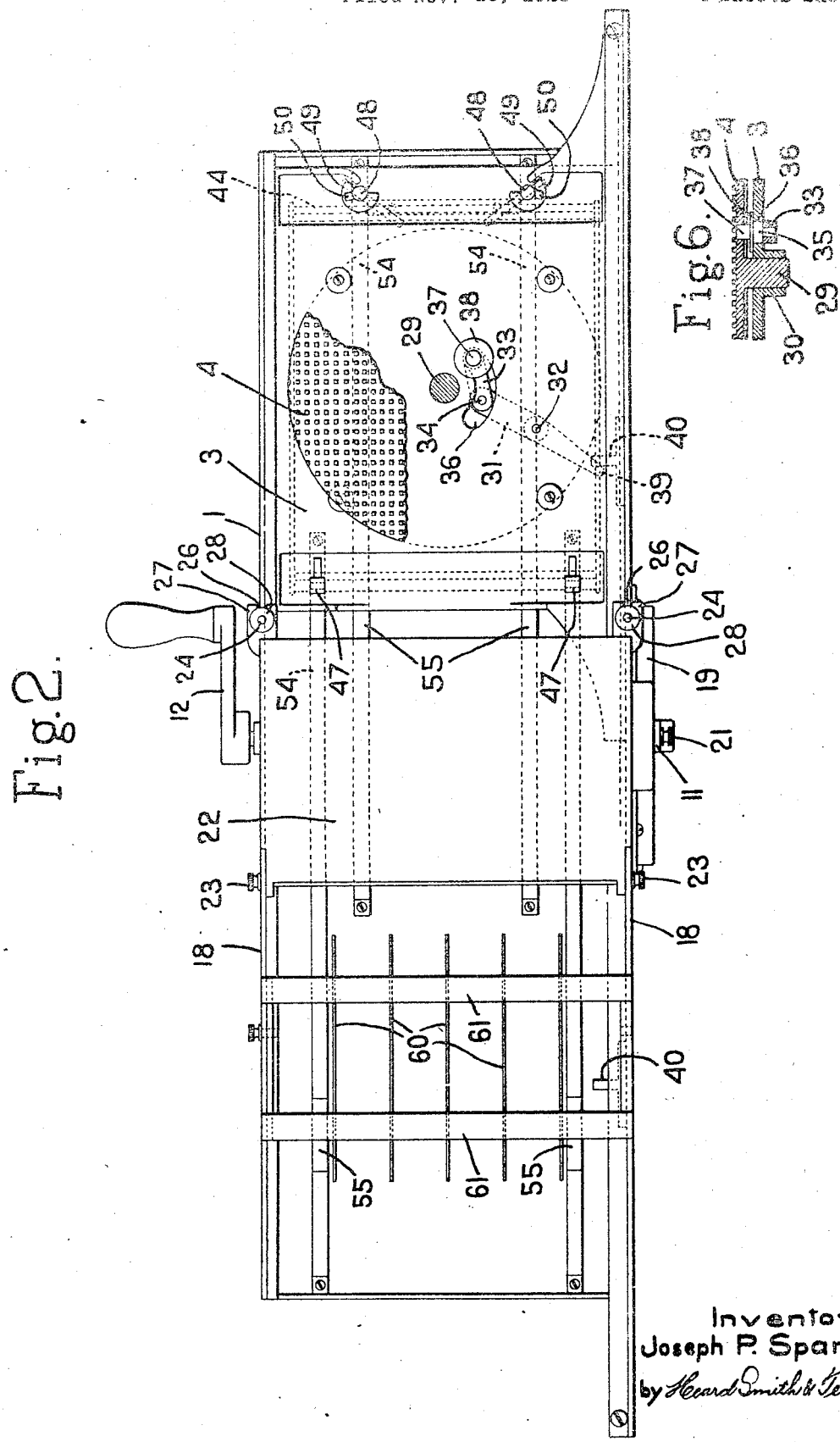

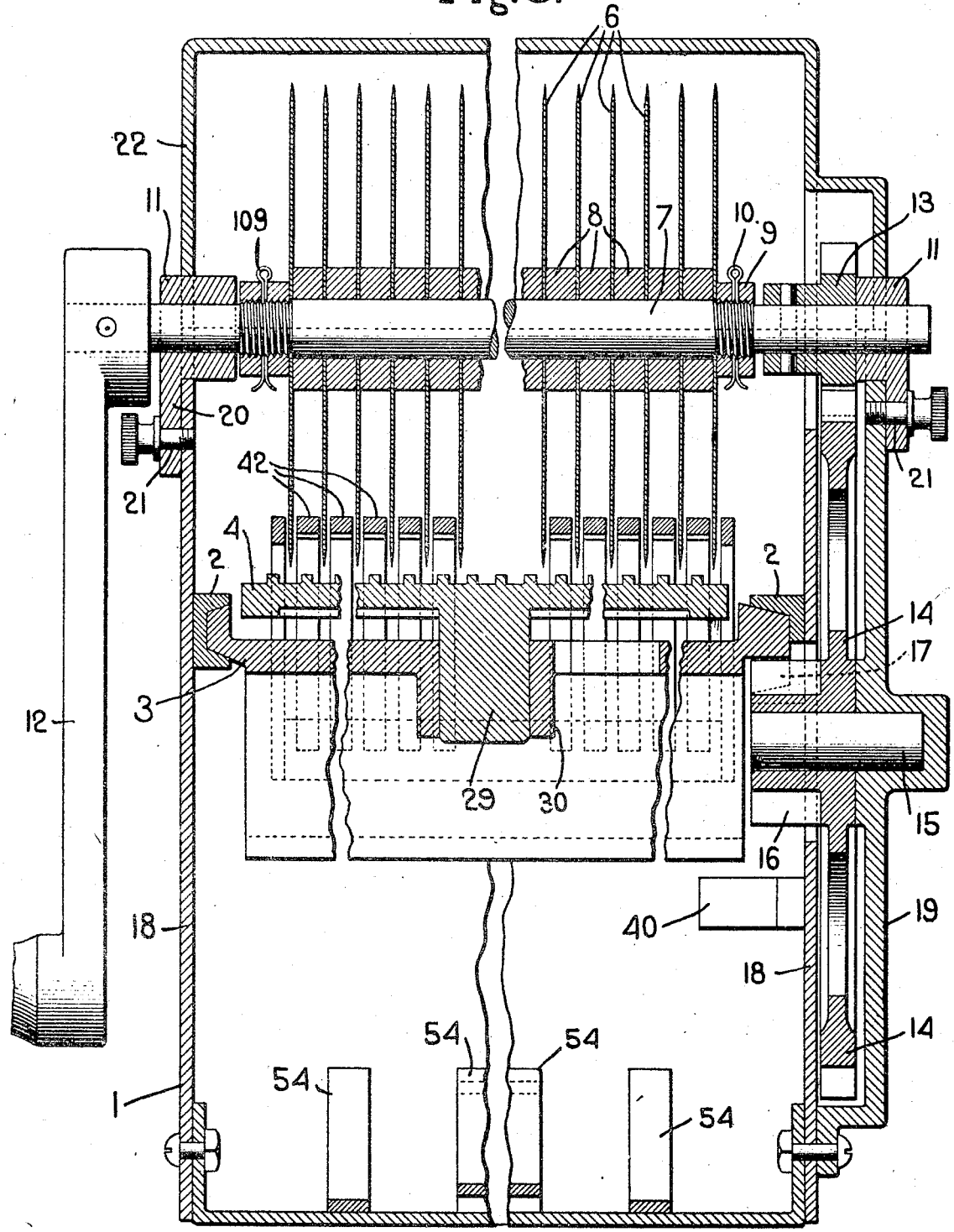

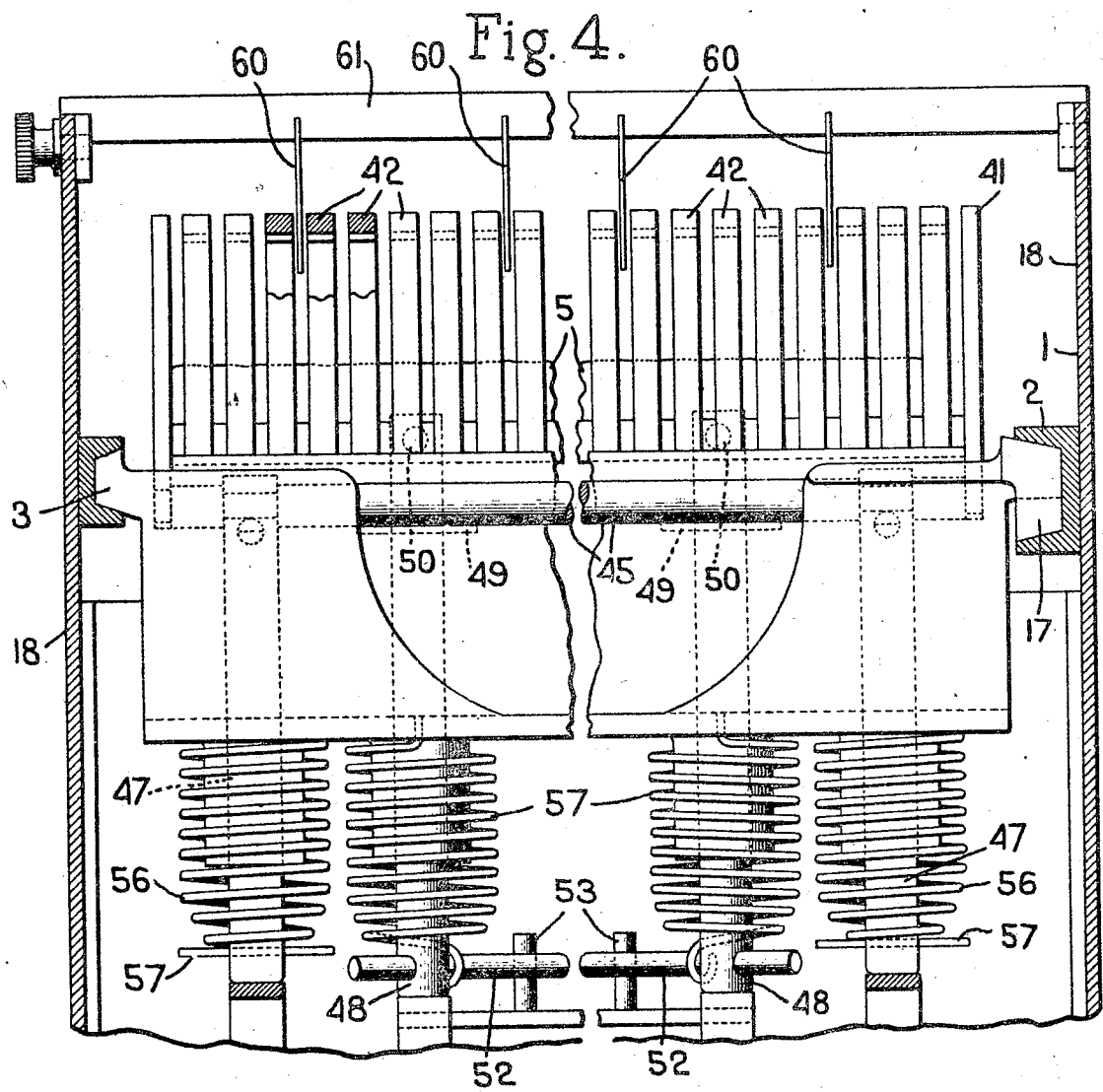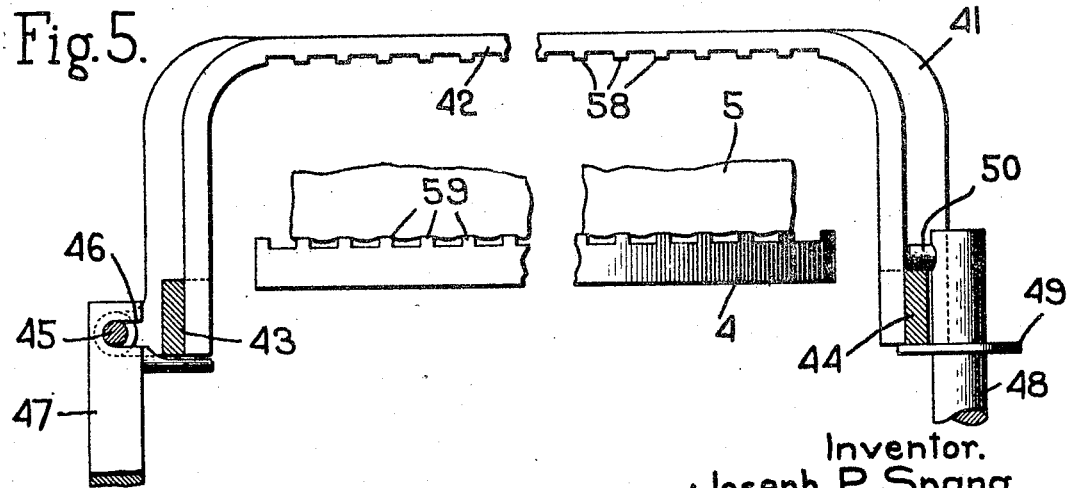

1,646,711

UNITED STATES PATENT OFFICE.

JOSEPH P. SPANG, OF QUINCY, MASSACHUSETTS.

MEAT-TENDERING DEVICE.

Application filed November 15, 1926. Serial No. 148,447.

This invention relates to a meat-tendering device of the type comprising a plurality of rotary knives, a bed reciprocating beneath the knives and on which the meat to be tendered is supported, and means for moving the bed back and forth beneath the knives as they are rotated thereby to cause the knives to cut slits in the meat.

A meat-tendering device having these features is illustrated in my co-pending application, Serial No. 97,151, filed March 25th, 1926 and the object of the present invention is to provide certain improvements in the machine illustrated in said co-pending application all as will be more fully hereinafter set forth and then pointed out in the appended claims.

In the drawings wherein I have illustrated a selected embodiment of my invention, Fig. 1 is a side view of a meat tenderer embodying the invention;

Fig. 2 is a top plan view with parts broken away;

Fig. 3 is an enlarged section on the line 3—3, Fig. 1;

Fig. 4 is an enlarged section on the line 4—4, Fig. 1;

Fig. 5 is a fragmentary view illustrating the hold-down or clamping member.

Fig. 6 is a fragmentary vertical sectional view through the turntable to show the connection between the pin 35 and said turntable.

The machine herein shown embodies the principal constructional features of the machine illustrated in my above-mentioned co-pending application Serial No. 97,151, and it comprises a frame 1 which is formed with ways 2 in which is slidably mounted a bed plate 3, the latter supporting a turntable 4 on which the meat 5 to be tendered is secured. The knives by which the meat is slit are indicated at 6. Said knives are disk knives, as in the above-mentioned application, and are supported on a knife-carrying shaft 7, said knives being spaced from each other on the shaft by spacers 8. The knives and spacers are clamped firmly together between two clamping nuts 9 which are screwthreaded to the shaft 7, said nuts being locked in their adjusted position by the cotter pins 10. The shaft 7 is supported in bearings 11 which are detachably secured to the frame so as to permit the knives to be readily removed for cleaning purposes. The shaft is provided with a handle 12 by which the knives are rotated.

During the operation of the machine the bed 3 is moved back and forth beneath the knives 6 as in the above-mentioned application and its movement is derived from the rotating movement of the shaft 7. Said shaft 7 has fast thereon a pinion 13 which meshes with a gear 14 that is loosely mounted on a stud 15 carried by the frame, said gear 14 having a pinion 16 fast therewith which meshes with rack teeth 17 formed on the bed 3.

The frame 1 is formed with two side members 18 and one side member has detachably secured thereto a cover plate 19 which encloses the gear 14 and which also forms a support for the stud 15. One of the bearings 11 for the shaft 7 is detachably secured to one of the side plates 18 and the other is detachably secured to the cover plate 19. These bearing members 11 rest on the upper edges of the side plate 18 and the cover plate 19 respectively and each bearing member has an arm 20 depending therefrom, these arms overlying the outer faces of the side plate 18 and cover plate 19 respectively and being secured thereto by clamping screws 21.

22 indicates a cover or guard which covers and protects the knives, said guard being pivoted to the side plates 18 as shown at 23. The guard is clamped in its closed relation by means of two clamping members 24 which are pivoted to the frame as shown at 25 and which are adapted to enter slots 26 formed in the ends of arms 27 extending from the cover plate 22. These clamping members have clamping screws 28 screw threaded thereto. When the clamping screws are loosened or backed off the clamps may be swung forwardly out of the open end of the slots 26 thus releasing the cover so that it may be swung backwardly out of the way as shown in dotted lines Fig. 1.

The removal of the knives for cleaning or other purposes may be accomplished by swinging the cover 22 backwardly and then removing the clamping screws 21 after which the knife shaft with the pinion 13 thereon may be readily lifted out of the machine.

The table 4 on which the meat 5 is supported is a turntable, as in my above-mentioned application, and means are provided whereby the table is given a turning movement at each end of the stroke of the bed. The turntable is provided with a central pivot stud 29 which is journalled in a bearing 30 formed in the bed plate 3. It is given its turning movement through the medium of a lever 31 pivoted to the frame beneath the bed at 32 and which is connected to the turntable through the medium of a link 33. One end of the link 33 is pivotally connected to the end of the lever at 34, the other end is pivotally connected to a stud 35 which operates in a slot 36 formed in the bed plate 3. The upper 37 of the stud 35 is loosely received in an aperture formed in the turntable 4 and said stud has a collar 38 thereon resting on the bed 3 and serving to support the stud.

The free end of the lever 31 has a depending portion 39 which is situated to be engaged by first one and then the other of two projections 40 secured to the side wall 18. The projections are situated to engage the lever just as the bed reaches the limit of its movement in either direction and the engagement of the lever with either projection swings the lever and through the link gives the turntable a quarter revolution. This turning movement of the turntable, therefore, occurs at each end of the stroke so that after the meat has once passed under the knives it will be given a quarter turn before it is brought back again beneath the knives. The slits which are made in the meat by the return passage of the bed plate are thus at right angles to those which are made during the forward stroke.

The meat 5 is retained on the table 4 by means of a hold-down or combined clamping and stripping member as in my above-mentioned application. This member is indicated generally at 41 and comprises a plurality of bars 42 which are bent downwardly at their ends and which are connected at one end by a cross member 43 and at the other end by a cross member 44. The hold-down or stripper member 41 has at one end a transversely-extending hinge rod 45 which is adapted to be received in slots 46 in two posts 47 that extend through the bed plate 3. This hold-down or stripper member 41 is held in its operative position by means somewhat similar to that illustrated in my co-pending application.

The bed 3 has extending vertically therethrough two posts 48 each having a collar 49 thereon on which the cross bar 44 may rest. Each post is also provided with a locking pin 50 which is adapted to engage the upper side of the cross bar 44 thus locking the hold-down or stripper member in place. The posts 48 are turnable about their axes thereby to swing the locking arm 50 into or out of locking engagement. Each post 48 depends below the bed frame and surrounding it is a spring 51, one end of the spring being fastened to the bed plate 3 and the other end being secured to a pin 52 extending laterally through the lower end of the post. These pins or arms 52 are adapted to engage stationary projections 53 just as the bed plate reaches the limit of its return movement, the engagement of the pins 53 with the projections turning the rods 48 and thus unlocking the stripper member 41. When said member is thus unlocked it can be swung upwardly out of the way about the cross rod 45 as a pivot as seen in dotted lines Fig. 1 at which time the slit meat may be removed from the turntable and a fresh piece of meat replaced thereon.

The projections 53 by which the stripper member is unlocked are situated at one end only of the bed so that the unlocking only occurs when the bed plate and turntable are in the extreme position shown in Fig. 2.

The device herein shown is also provided with means for raising the hold-down or stripper 41 from the meat at each end of the stroke and at the time that the turntable is rotated. This is accomplished by means of cam tracks 54, 55 which are situated so that the lower ends of the posts 47 and 48 ride up the tracks just before the bed reaches either limit of its movement.

The posts 47 are acted upon by springs 56, the upper ends of which bear against the bed, the lower ends of which engage pins 57 extending through the posts 47. The springs 56 and 51 thus yieldingly hold the hold-down or stripper 41 against the meat while the meat is being carried beneath the knives but as the bed approaches either end of its stroke the posts run up the inclined cam tracks 54 or 55 and are thus raised. The hold-down or stripper member 41, it will be remembered, is carried by the posts 47 and 48 and thus the raising of the posts 47, 48 will lift the stripper member away from the turntable. The cam tracks 54 are situated so that they act on the posts 47, 48 when the bed approaches the right hand end of its stroke in Fig. 1 thus elevating the stripper as shown in said Fig. 1. The cam tracks 55 are situated to engage the posts 47, 48 and thereby raise the stripper when the bed approaches the left hand end of its stroke Fig. 1. Hence at each end of the stroke the stripper 41 is raised from the meat so that the turntable with the meat thereon is free to be turned.

The strips 42 of the stripper 41 are provided on their under faces with projections 58 which embed themselves in the meat and thus more securely hold the meat on the turntable during the slitting operation. It will be noted that the upper surface of the turntable is also provided with projections 59. By having these projections on both parts between which the meat is clamped, that is, the turntable and the stripper member, the meat will be firmly held on the turntable during the slitting operation.

I will preferably make the projections 58 on adjacent strips 42 with a staggered relation.

I have also provided herein a shedder for stripping the meat from the stripper member 41 as the latter is raised at the rear or left hand end of the stroke in Fig. 1. This shedder comprises a plurality of blades 60 which are carried by two cross bars 61 that are supported by the sides 18 of the frame. The shedder blades have such a vertical dimension that the lower ends thereof stand below the strips 42 when the stripper is raised at the right hand end of the stroke of the bed as seen clearly in Fig. 4. Thus when the bed 3 has completed its movement to the left in Fig. 1 and the stripper 41 is raised off from the meat 5 to permit the turntable to be turned the shedder blades 60 enter between some of the strips 42 and serve to strip the meat from the strips in case it should stick thereon.

While I have illustrated herein a selected embodiment of my invention I do not wish to be limited to the constructional features shown.

I claim:

1. In a meat-tendering device, the combination with a plurality of rotary knives, of a meat-supporting table mounted for reciprocation beneath the knives, means to rotate the knives and to reciprocate the table, a hold-down member for clamping the meat to the table while it is being acted on by the knives, means to raise the hold-down from the meat at the end of the reciprocating movement of the table, means to turn the table, and a shedder to strip the meat from the hold-down in case it should stick thereto when the latter is raised.

2. In a meat-tendering device, the combination with a plurality of rotary knives, of a reciprocating table mounted for reciprocation beneath the knives, means to rotate the knives and to reciprocate the table, a hold-down comprising a plurality of strips for clamping the meat onto the table while acted upon by the knives, means to raise the hold-down from the meat at the end of the reciprocating movement of the table, means to turn the table, and a shedder comprising shedder plates supported above the hold-down and arranged to strip the meat from the hold-down as the latter is raised.

3. In a meat tenderer, the combination with a plurality of rotary knives, of a meat-supporting member on which the meat to be tendered is supported, a combined clamp and stripping member yieldingly holding the meat in place, means to rotate the knives and to move the meat-supporting member beneath the knives, both the meat-supporting member and the stripping member having projections to engage the meat and hold it from slipping movement.

4. In a meat tenderer, the combination with a frame having side plates and provided with ways, of a bed slidably mounted in said ways and on which the meat is supported, two bearing members removably secured to the side plates of the frame, a shaft journalled in said bearing member, rotary knives carried by said shaft, and means actuated by the rotary movement of the shaft to reciprocate the bed in its ways, the removable bearing members permitting the knife assembly to be readily removed for cleaning or for repair.

5. In a meat tenderer, the combination with a frame comprising two side plates having ways, of a bed reciprocating in said ways and on which the meat is supported, said bed having rack teeth, of a cover plate secured to one side plate of the frame but spaced therefrom, a stud carried by said cover plate, a pinion journalled on said stud and engaging said rack teeth, a gear rigid with said pinion and situated within the cover plate, two bearing members, one carried detachably by the cover plate and the other carried detachably by one of the side plates, a shaft journalled in said bearing members and provided with a pinion meshing with said gear, rotary knives mounted on said shaft, and means for operating the shaft.

In testimony whereof, I have signed my name to this specification.

JOSEPH P. SPANG.